United States Patent Office

2,809,914
Patented Oct. 15, 1957

2,809,914

ENCEPHALOMALACIA TREATMENT COMPOSITIONS CONTAINING 2,6-DITERTIARY-BUTYL-4-METHYL PHENOL AND METHODS OF USING SAME

Evan Ludvig Robert Stokstad, Pearl River, N. Y., assignor to American Cyanamid Company, New York, N. Y., a corporation of Maine No Drawing. Application September 14, 1954, Serial No. 456,083

4 Claims. (Cl. 167—53.1)

This invention relates to encephalomalacia and methods for its prevention and control.

Encephalomalacia is a nutritional disease of poultry which can be induced under experimental conditions by a vitamin E deficient diet. In chicks, under field conditions, the syndrome is readily recognizable to the experienced poultry man under the name "crazy chick" disease. Once the disease has reached the clinical stage, no known therapy can reverse the degenerative process and the poultry must be sacrificed. Pathological examination of the necrotic areas a day or two after onset of symptoms reveals a softening and swelling of the cerebellum and edema of the meninges.

Although the disease has primarily been studied and observed in the chick, ducklings and turkeys are also affected. In ducks, the muscular dystrophy syndrome is evidenced by a universal degeneration of the skeletal muscle but the other organs and tissues are not involved. In poults, myopathy of the smooth muscle of the gizzard is indicated by characteristic lesions.

In all poultry affected by enecphalomalacia the disease manifests itself between the fifteenth and thirtieth day of the chicks' life, although it has been known to occur as early as the first week and as late as the eighth week. The birds at first appear droopy and show lack of co-ordination in muscular movements. This is followed by rapid contraction and relaxation of the legs culminating in prostration and death.

Encephalomalacia is believed to be attributable entirely to E-avitaminosis. It can be experimentally induced by feeding chicks a vitamin E-low diet. It has also been demonstrated that by feeding chicks a normal vitamin E diet together with fish liver oils, symptoms of encephalomalacia can be produced. It is believed that the factor which causes the disease in such cases is the rancidity of the fish liver oil which destroys the vitamin E. Although it cannot be definitely ascertained, it is believed that the oils, upon being exposed to air, form peroxides which accelerate the destruction of vitamin E.

In the past, encephalomalacia has been controlled by the addition of vitamin E to regular commercial diets. The obvious disadvantage in the use of vitamin E in poultry is its high cost. Vegetable oils such as cotton seed, peanut, wheat germ and soy bean have also been used, but these are undesirable because of their instability. Alpha-tocopherol, the active fraction of vitamin E, has also been used as the acetate salt. As in the case of vitamin E, this method of preventing the disease in large flocks of poultry can present economic difficulties.

It has been discovered that the compound 2,6-ditertiary-butyl-4-methyl phenol, when used in certain limited quantities, is useful in preventing encephalomalacia in chicks, ducks and turkeys. Although this compound is known, I am unaware of its previous use in the control of poultry disease.

To illustrate the protective effect of 2,6-ditertiarybutyl-4-methyl phenol, a series of experiments were run for four-weeks using day-old chicks from hens on a vitamin E-low ration. The tests were conducted in groups of 11 New Hampshire males and 11 Barred Plymouth Rock females per lot. The controls were fed a vitamin E-low basal ration having the following composition:

| | Percent |
|---|---|
| White corn meal | 68.40 |
| Soybean oil meal (50%) | 10.00 |
| Crude casein | 15.00 |
| Fish meal (60%) | 2.50 |
| Dicalcium phosphate | 2.00 |
| Ground limestone | 1.50 |
| Salt | 0.50 |
| Manganese sulfate | 0.0125 |
| Vitamin A and D feeding oil | 2.00 |

To the above basal diet was added 0.025 percent of the compound 2,6-ditertiary-butyl-4-methyl phenol and fed to the "treated" lot. The average weight of chicks in the lots fed the basal diet and vitamin A and D feeding oil was 362 grams. The average weight of the chicks fed the basal diet and vitamin A and D feeding oil together with 0.025 percent of 2,6-ditertiary-butyl-4-methyl phenol was 333 grams.

Of the chicks fed the basal diet containing the vitamin A and D feeding oil alone, 50 percent died of encephalomalacia. Of chicks fed the basal diet containing vitamin A and D feeding oil and 0.025 percent of 2,6-ditertiary-butyl-4-methyl phenol, none died. Thus the experiment adequately demonstrates the ability of 2,6-ditertiary-butyl-4-methyl phenol to protect chicks from death caused by artificially induced nutritional encephalomalacia.

In another series of experiments an attempt was made to demonstrate the surprising qualities of 2,6-ditertiary-butyl-4-methyl phenol when compared to other compounds of the same class with respect to their relative ability to protect chicks from death by artificially induced encephalomalacia. In each case a 0.0125 percent quantity of the respective antioxidant was added to the basal diet (supra). Lots of New Hampshire male and Barred Plymouth Rock female chicks, eleven in each, were used. The results are shown in Table I below:

*Table I*

| Treatment | Average Body Weight in grams | Percent Mortality |
|---|---|---|
| Control (basal diet containing 2% A and D feeding oil) | 285 | 55 |
| 2,2'-methylene-bis-(4-methyl-6-tert-butyl phenol | 295 | 40 |
| 2-tert-butyl-4-methoxy phenol | 295 | 45 |
| 2,6-ditertiary-butyl-4-methyl phenol | 308 | 0 |

The above experiments show the surprising and unexpected properties of 2,6-ditertiary-butyl-4-methyl phenol as a prophylactic against encephalomalacia in poultry. Other compounds belonging to the same class, when tested in parallel, were substantially ineffective in protecting the chicks from artificially induced nutritional encephalomalacia. The experiment adequately substantiates the truly surprising discovery that 2,6-ditertiary-butyl-4-methyl phenol, despite its related structure to other compounds which are ineffective for this purpose, is a desirable and highly beneficial additive to poultry feed mixtures.

A most important advantage of 2,6-ditertiary-butyl-4-methyl phenol as a prophylatic for encephalomalacia is the extremely low doses in which it is demonstrably effective. When mixed with ordinary rations, quantities varying from about 0.0065 percent to about 0.5 percent are capable of protecting poultry from death. A level lower than 0.0065 percent is ineffective whereas quantities substantially above 0.5 percent are toxic, resulting in lack of growth and eventual death. I have found that quantities in the range from about 0.0125 to 0.25 percent are adequate in protecting poultry against onset of the disease.

It is not presently known whether 2,6-ditertiary-butyl-4-methyl phenol acts by stabilizing the vitamin E present in the ration or by aiding in the utilization of vitamin E in the tissue of the poultry. Although the disease does occur in the absence of fish-oil ingestion, inasmuch as most commercial feeds contain fish oil either in the form of vitamin A and D or fish meal it is believed that a substantial percentage of the diseased cases occurring in the field can be attributed directly to the presence of fish oil.

Although it is known that encephalomalacia occurs most commonly in 1-day old to 8-week old chicks, it is recommended that 2,6-ditertiary-butyl-4-methyl phenol be added to basal ration diets throughout the life of the fowl. In growing meat birds the antioxidant should be given until the birds are marketed. In birds raised primarily for reproduction it is most essential that the antioxidant be administer until the fowl is sacrificed, since it is well known that encephalomalacia occurs in chicks with a maternal history of malnutrition, specifically vitamin E deficiency.

A preferred manner of administering the 2,6-ditertiary-butyl-4-methyl phenol of the present invention is to thoroughly mix the drug in the poultry feed in the proportions indicated above, although other means of administration readily occurring to those skilled in the art are not precluded. For example, it may be desirable to administer the drug to each chick in one or more daily doses in capsules or pellets.

Although the basal ration diets disclosed above were used to demonstrate the efficacy of the antioxidant as a prophylatic against encephalomalacia, it is not intended that they be considered as a limitation upon the scope of the carriers which are practicable within the spirit of this invention. Any commonly available commercial fowl ration may be used as a carrier provided that it contains the minimum carbohydrates, proteins, and vitamins required for fowl growth. As further examples of suitable rations with which the 2,6-ditertiary-butyl-4-methyl phenol of the present invention may be suitably admixed may be given.

I

| | |
|---|---|
| Corn _____ percent _ _ | 36.5 |
| Soybean meal (41%) _____ do _ _ _ _ | 35 |
| Fish solubles _____ do _ _ _ _ | 1 |
| Whey _____ do _ _ _ _ | 3 |
| Bone meal, steamed _____ do _ _ _ _ | 1.5 |
| Calcite flour _____ do _ _ _ _ | 1.5 |
| Iodized salt _____ do _ _ _ _ | 0.04 |
| Manganese sulfate _____ do _ _ _ _ | 0.05 |
| Dry $D_3$, 2000 u./g _____ do _ _ _ _ | 0.05 |
| Dry A, 5000 u./g _____ do _ _ _ _ | 0.2 |
| Methionine DL _____ do _ _ _ _ | 0.05 |
| Choline dry (25%) _____ do _ _ _ _ | 0.6 |
| Riboflavin _____ mg _ _ | 0.3 |
| Ca pantothenate _____ mg _ _ | 1.5 |
| Aurofac[1] Chlortetracycline—vitamin $B_{12}$ supplement _____ percent _ _ | 0.5 |

II

| | Percent |
|---|---|
| Corn yellow, fine ground _____ | 62 |
| Soybean, fine ground (44%) _____ | 20 |
| Corn gluten meal _____ | 5 |
| Fish meal _____ | 5 |
| Alfalfa meal _____ | 2 |
| Distiller's solubles _____ | 2.5 |
| Manganese sulfate _____ | 2 |
| Bone meal (steamed) _____ | 1.5 |
| NaCl _____ | 0.5 |
| Choline chloride (25%) _____ | 0.1 |
| Megasul,[1] 26% nitrophenide, 2% Di-sorbitol and soybean meal mixture _____ | 0.1 |
| Fortafeed[1] riboflavin, pantothenic acid, niacin, folic acid and choline chloride _____ | 0.1 |

Vitamin A and D, dry:
    2,000 u./g. $D_3$
    10,000 u./g. A
Profactor[1]—B to furnish 10 mg. vitamin $B_{12}$ per ton (vitamin $B_{12}$ supplement).

[1] Trademarks of American Cyanamid Company.

I claim:

1. A poultry feed for the control of encephalomalacia which comprises edible poultry food containing vitamin E in a therapeutically inadequate amount and from about 0.0065 percent to about 0.5 percent by weight of 2,6-ditertiary-butyl-4-methyl phenol.

2. A composition for the control of encephalomalacia in poultry comprising chicken feed containing vitamin E in a therapeutically inadequate amount, a feeding oil and 2,6-ditertiary-butyl-4-methyl phenol, said 2,6-ditertiary-butyl-4-methyl phenol being present in the feed in an amount from about 0.0125 to about 0.25% by weight.

3. A process for controlling encephalomalacia in poultry which comprises feeding the poultry a composition comprising an edible poultry food containing vitamin E in a therapeutically inadequate amount and from about 0.0065 percent to about 0.5 percent by weight of 2,6-ditertiary-butyl-4-methyl phenol.

4. A process for controlling encephalomalcia in chickens which comprises feeding the chikens a composition comprising chicken feed containing vitamin E in a therapeutically inadequate amount, a feeding oil and 2,6-ditertiary-butyl-4-methyl phenol, said 2,6-ditertiary-butyl-4-methyl phenol being present in the feed in an amount from about 0.0125 percent to about 0.25 percent by weight.

References Cited in the file of this patent

UNITED STATES PATENTS 2,693,435      Stieg _____ Nov. 2, 1954

OTHER REFERENCES

Wasson et al.: Ind. and Eng. Chem., vol. 45, pp. 197–200 (1953).

Eddy: Vitaminology, 1949, Williams and Wilkins Co., Baltimore, pp. 65 and 79.

U. S. Dispensatory, 24th ed., 1947, Pippincott Co., Phila., p. 1647.

Wasson et al.: Chem. Abstr., vol. 47, 1953, p. 3550i.

Ferrando: Chem. Abstr., vol. 42, 1948, pp. 8900i and 8901a.